United States Patent
Yamashita et al.

[19]

[11] Patent Number: 6,161,380
[45] Date of Patent: Dec. 19, 2000

[54] HYDRAULIC PRESSURE BOOSTING APPARATUS

[75] Inventors: Kuraji Yamashita; Osamu Kanazawa; Hiroyuki Yamaga, all of Saitama, Japan

[73] Assignee: Jidosha Kiki Co., Ltd., Tokyo, Japan

[21] Appl. No.: 09/184,128

[22] Filed: Nov. 2, 1998

[30] Foreign Application Priority Data

Nov. 17, 1997 [JP] Japan ................................. 9-332458
Feb. 25, 1998 [JP] Japan ................................ 10-043513

[51] Int. Cl.⁷ ................................................ F16D 31/02
[52] U.S. Cl. ................................ 60/404; 60/548; 91/368
[58] Field of Search ........................... 60/413, 417, 418, 60/548, 552, 404, 374; 91/368

[56] References Cited

U.S. PATENT DOCUMENTS 3,751,912 8/1973 Bach .......................................... 60/548
4,131,055 12/1978 Erwin ......................................... 91/378
4,154,059 5/1979 Bach et al. ................................. 60/404

*Primary Examiner*—Edward K. Look
*Assistant Examiner*—Thomas E. Lazo
*Attorney, Agent, or Firm*—Sughrue, Mion, Zinn, Macpeak & Seas, PLLC

[57] ABSTRACT

A booster 3 has a structure that a return valve 14 is formed into a two-step throttle incorporating a first throttle valve 36 and a second throttle valve 37 formed continuously from the first throttle valve 36. When a valve spool 28 has been moved forwards when the operation is performed, a gap of the first throttle valve 36 is reduced. Also a gap of the second throttle valve 37 is reduced. Therefore, hydraulic fluid discharged from a pump is passed through an inlet passage 12, and then introduced into the second annular groove 13. Then, the hydraulic fluid is throttled by the first throttle valve 36, and then throttled by the second throttle valve 37. That is, the hydraulic fluid is throttled in the two-step throttling manner. As a result of the two-step throttling structure, the overall velocity of the flow of the hydraulic fluid can smoothly be changed without rapid change. Therefore, fluid flow noise caused from the change in the velocity of the flow can be prevented.

9 Claims, 10 Drawing Sheets

HYDRAULIC PRESSURE BOOSTING APPARATUS

BACKGROUND OF THE INVENTION

1. Field of the Invention

The present invention relates to a technical field of a hydraulic pressure boosting apparatus of an open center type which uses the hydraulic pressure of hydraulic fluid to boost the leg power applied to a brake pedal of, for example, an automobile, so as to enlarge braking force.

The present application is based on Japanese Application Nos. Hei.9-332458 and 10-43513, which are incorporated herein by reference.

2. Description of the Related Art

A portion of vehicles, for example, automobiles, incorporates a hydraulic pressure boosting system for boosting operating force of an operating member by dint of the hydraulic pressure of hydraulic fluid so as to produce an output. The hydraulic pressure boosting system includes a hydraulic pressure boosting system arranged to obtain large braking force which cannot be obtained by only leg power applied to a brake pedal or to reduce the leg power which must be applied to the brake pedal. The hydraulic pressure boosting system incorporates a hydraulic pressure brake boosting apparatus which is operated by dint of the hydraulic pressure of hydraulic fluid so as to boost the leg power and operate a master cylinder.

As a hydraulic pressure boosting system of the foregoing type, a conventional hydraulic pressure boosting system has a structure as shown in FIG. 5. Referring to the drawing, reference numeral 1 represents a hydraulic pressure brake system, 2 represents a brake pedal, 3 represents an open center type hydraulic brake booster (hereinafter called a "brake booster" or simply called a "booster") which is operated by the brake pedal 2 and which boosts the leg power applied to the brake pedal 2 so as to produce an output, 4 represents a tandem type master cylinder which is operated by the output of the booster 3 and which generates braking hydraulic pressure, 5 represents a brake cylinder which is operated by dint of the braking hydraulic pressure applied from the master cylinder 4 so as to generate braking force which must be supplied to each wheel and 6 represents a pump which is operated by an engine 7 so as to supply hydraulic fluid to the booster 3. Reference numeral 8 represents a reservoir for accumulating the hydraulic fluid, and 9 represents an emergency accumulator for accumulating emergency hydraulic pressure for operating the booster 3 in a case where a breakdown or the like of the pump 6 results in inhibition of supply of the hydraulic fluid from the pump 6.

The open center type booster 3 incorporates a return valve, the gap of which is maximally opened when the brake is not operated so as to freely pass the hydraulic fluid. The gap of the return valve is throttled when the brake is operated so that the flow of the hydraulic fluid is limited and thus a hydraulic pressure is generated. The generated hydraulic pressure is used to boost the input so as to produce an output. A variety of structures have been known. For example, a known booster 3 is shown in FIG. 6.

As shown in FIG. 6, the booster 3 has a structure that a first annular groove 11, which is always communicated with the reservoir 8 through a circulating passage 10, and a second annular groove 13, which is always connected to the pump 6 through an inlet passage 12, constitute a return valve 14 which controls return of the hydraulic fluid discharged from the pump 6 to the reservoir 8. The second annular groove 13 and a third annular groove 20, which is always communicated with a power house 19, constitute a supply valve 21 for supplying the pressure generated in the second annular groove 13 and discharged from the pump 6 to the power house 19, the third annular groove 20 being communicated to the power house 19 through the second annular groove 13, a first radial-directional opening 15, an axial-directional opening 16, a second radial-directional opening 17 and a check valve 18. Moreover, the third annular groove 20 and a fourth annular groove 23 which is always communicated with the reservoir 8 through a discharge passage 22 constitute a discharge valve 24 for discharging, to the reservoir 8, the hydraulic fluid supplied to the power house 19.

In a state in which the brake is not operated as shown in FIG. 6, the return valve 14 is opened so that the gap (a gap between the first annular groove 11 and the second annular groove 13) of the return valve 14 is maximized. Moreover, the supply valve 21 is closed. In addition, the discharge valve 24 is opened so that a gap (a gap between the third annular groove 20 and the fourth annular groove 23) of the discharge valve 24 is maximized. Therefore, the hydraulic fluid discharged from the pump 6 passes through the inlet passage 12, the second annular groove 13, the return valve 14 and the circulating passage 10 of the open center type booster 3. Then, the hydraulic fluid is returned to the reservoir 8. Since the gap of the return valve 14 has been maximized in the above-mentioned case, substantially no hydraulic pressure is generated in the second annular groove 13.

When application of leg power to the brake pedal 2 causes the input shaft 25 to be moved forward in the above-mentioned state, the lever 26 is clockwise rotated around a fulcrum 27. Thus, the valve spool 28 is moved forward. Thus, the gap of the return valve 14 is throttled and the discharge valve 24 is closed. In addition, the supply valve 21 is opened. Since the gap of the return valve 14 is throttled (sometimes the return valve 14 is finally closed), hydraulic pressure is generated in the second annular groove 13. The generated hydraulic pressure is passed through the opened supply valve 21, the third annular groove 20, the first radial-directional opening 15, the axial-directional opening 16, the second radial-directional opening 17 and the check valve 18. Then, the hydraulic pressure is introduced into the power house 19. Since the hydraulic pressure introduced into the power house 19 acts on a power piston 29, the power piston 29 generates braking force obtained by boosting the leg power. An output of the braking force is produced from an output shaft 30 so that the master cylinder 4 is operated and thus the brake is operated.

The hydraulic pressure generated in the second annular groove 13 rightwards, in FIG. 6, moves a valve 33 of a charging valve 32 in the form of a check valve of an accumulator valve 31 so that the valve 33 is separated from a rubber seat 34 whereby opening charging valve 32. Thus, the hydraulic pressure passes through a gap between the valve 33 and the rubber seat 34, a portion around the valve 33 and an accumulator passage 35, and then introduced into the emergency accumulator 9 so as to be accumulated in the emergency accumulator 9.

When the brake pedal 2 has been released, the input shaft 25 is moved rearwards to a non-operating position shown in the drawing. Moreover, the lever 26 is counterclockwise rotated around the fulcrum 27 outer surface that the valve spool 28 is moved rearwards to a non-operating position shown in the drawing. As a result, the gap of the return valve 14 is opened maximally. Moreover, the supply valve 21 is closed and the discharge valve 24 is opened maximally. Therefore, the hydraulic fluid in the power house 19 is passed through the opening 17, 16 and 15, the third annular groove 20, the gap of the discharge valve 24, the fourth annular groove 23 and the discharge passage 22 so as to be discharged to the reservoir 8. As a result, the hydraulic pressure in the power house 19 is reduced. Thus, the power piston 29 is moved rearwards to a non-operating position shown in the drawing so that the braking force is vanished. Therefore, the master cylinder 4 is returned to the non-operating state so that the braking operation is suspended. Since the gap of the return valve 14 is maximized, the hydraulic pressure generated in the second annular groove 13 is vanished. Thus, the hydraulic fluid discharged from the pump 6 is passed through the return valve 14 and circulated to the reservoir 8 as described above.

FIG. 12 is a diagram showing an example of a conventional hydraulic booster. A power piston 108 is slidably engaged to a power cylinder 110 formed in a housing 106. A push rod 116 is connected to the front surface of the power piston 108 so that an output of the power piston 108 is transmitted to a master cylinder (not shown). An input cylinder 114 is formed on the same axis of the power cylinder 110. An input piston 112 is movably engaged to the inside portion of the input cylinder 114. An end 120b of the input rod 120 is secured to the front surface of the input piston 112. A leading end 120a of the input rod 120 is slidably received in a circular opening 108b formed on the rear surface of the power piston 108. A leading end ball portion of an operating rod which is movable when a brake pedal (not shown) is operated is connected to an end of the housing 106 of the input piston 112 facing outside. When the operating rod is moved, the input piston 112 and the input rod 120 are moved.

A spool valve 128 is provided for the inside portion of the housing 106, the spool valve 128 being arranged to introduce hydraulic fluid discharged from a pump 135 after a passage has been switched into a power pressure chamber 132 formed between the power piston 108 and the input piston 112. A spool 126 of the spool valve 128 is operably connected to the power piston 108 and the input rod 120 through a lever 146 so as to be moved when the input piston 112 and the input rod 120 are moved. Thus, the passage for the hydraulic fluid is switched.

An emergency accumulator 173 is connected to the hydraulic booster. When the pressure discharged from the pump 135 has been raised during the operation of the brake, a charge valve (not shown) is opened. Thus, the pressure is accumulated in the accumulator 173. If a boosting operation is not performed because of inhibition of rise in the pressure in the power pressure chamber 132 owing to a breakdown of the pump 135 or the like, the pressure in the accumulator 173 is discharged so that the boosting operation is performed. A dump valve 184 which is opened in an emergency or the like so as to introduce the pressure in the accumulator 173 into the power pressure chamber 132 is provided for the inside portion of the housing 106.

In general, the conventional dump valve 184 incorporates a seat member 186 including a passage, a ball valve 190 which can be placed on a valve seat of the seat member 186 and a pin 196 inserted into the passage in the seat member 186 and arranged to upwards push the ball valve 190 so as to separate the ball valve 190 from the valve seat in an emergency. The dump valve 184 is slidably engaged to an end of the spool 126 so as to be opened when a retainer 151 and a sleeve 152 urged toward the end by a spring 154 have been moved through the lever 146 to push the pin 196.

In the hydraulic booster having the above-mentioned structure, the operating rod is moved forwards (to the left in the drawing) when the brake pedal (not shown) has been pressed. Thus, the input piston 112 and the input rod 120 are moved forwards. When the input rod 120 has been moved forwards, the lever 146 is swung such that a connection pin adjacent to the spool 126 serves as a fulcrum to forwards move the power piston 108. The forward movement of the power piston 108 results in the push rod 116 to push the piston of the master cylinder so that pressure is generated in the master cylinder. When the pressure has been generated in the master cylinder, the forward movement of the power piston 108 is inhibited. Thus, the lever 146 starts swinging such that the connection pin connected to the power piston 108 serves as a fulcrum. Thus, the spool 126 is moved forwards. When the spool 126 has been moved forwards, the passage of the spool valve 128 is switched. As a result, the fluid discharged from the pump 135 is introduced into the power pressure chamber 132 so that the power piston 108 is operated and the boosting operation is performed.

In a case where the pump 135 has been broken, no pressure is supplied to the power pressure chamber 132 even if the input rod 120 is moved forwards to move the spool 126 to the left in FIG. 12 so as to switch the passage of the spool valve 128. When further forward movement of the spool 126 is inhibited after the full stroke of the spool 126, the rotation of the lever 146 causes the sleeve 152 and the retainer 151 to move forwards such that the spring 154 is compressed. Since the pin 196 of the dump valve 184 is pressed, the ball valve 190 is separated from the valve seat of the seat member 186 so that the dump valve 184 is opened. Thus, the pressure accumulated in the accumulator 173 is passed through the passage around the pin 196 so as to be supplied to the power pressure chamber 132. Therefore, the boosting operation is started.

In the booster 3 of the hydraulic pressure brake system 1, change in the velocity of the flow of the hydraulic fluid is enlarged when the valve spool 28 has been moved forwards and thus the gap of the return valve 14 has been throttled. Therefore, there is apprehension that fluid flow noise takes place.

Further, the conventional hydraulic booster has the structure that the dump valve is operated in an emergency to introduce the pressure accumulated in the emergency accumulator into the power pressure chamber. In this case, the hydraulic fluid in the accumulator is allowed to pass through a gap between the ball valve and the valve seat and the passage into which the pin has been inserted. Thus, the hydraulic fluid is introduced into the power pressure chamber. Therefore, there arises a problem in that noise of the flow of the fluid is caused because the velocity of the flow is raised since the hydraulic fluid is throttled by the gap and so forth.

SUMMARY OF THE INVENTION

In view of the foregoing, an object of the present invention is to provide a hydraulic pressure boosting apparatus which is capable of preventing fluid flow noise when the return valve has been throttled.

And to solve the above-mentioned problem, an object of the present invention is to provide a hydraulic booster which is able to reduce the velocity of the flow of the hydraulic fluid which flows in the dump valve so that noise of the flow of the fluid is prevented.

According to a first aspect of the invention, there is a structure that a return valve of a hydraulic pressure boosting apparatus incorporates a first throttle valve and a second throttle valve so that two step throttling is performed such that the first throttle valve first throttles the flow of the hydraulic fluid after which the second throttle valve throttles the flow.

According to a second aspect of the present invention, there is a structure that a valve spool, the operation of which is controlled by dint of the operation of the input shaft, is slidably engaged to an opening in a housing or an opening of a sleeve engaged and secured to the opening of the housing, and each of the first throttle valve, the second throttle valve, the supply valve and the discharge valve is constituted by the valve spool and the housing or the sleeve to which the valve spool is slidably engaged.

According to a third aspect of the present invention, there is a structure that the first throttle valve has the cross sectional area which is gradually and downstream enlarged.

According to a fourth aspect of the present invention, there is a structure that the return valve has the cross sectional area which is gradually and downstream enlarged.

According to a fifth aspect of the present invention, there is a structure that a valve spool, the operation of which is controlled by dint of the operation of the input shaft, is slidably engaged to an opening in a housing or an opening of a sleeve engaged and secured to the opening of the housing, and each of the throttle valve, the supply valve and the discharge valve is constituted by an annular groove formed in the outer surface of the valve spool and an annular groove formed in the inner surface of an opening of the housing or an opening of the sleeve to which the valve spool is slidably engaged, a passage portion having the cross sectional area which is gradually and downstream enlarged is structured such that the inner diameter of a bottom portion of the annular groove formed in the inner surface of the opening of the housing or the opening of the sleeve, and a surface of the bottom portion is formed into a tapered surface in the axial direction.

According to a sixth aspect of the present invention, there is a structure that the outer diameter of a portion of the outer surface of the valve spool corresponding to the annular groove of the opening of the housing or the opening of the sleeve formed into the tapered surface is gradually and downstream enlarged, and the outer surface portion is formed into a tapered surface in the axial direction.

According to a seventh aspect of the present invention, there is a structure that a valve spool, the operation of which is controlled by dint of the operation of the input shaft, is slidably engaged to an opening in a housing or an opening of a sleeve engaged and secured to the opening of the housing, and each of the throttle valve, the supply valve and the discharge valve is constituted by an annular groove formed in the outer surface of the valve spool and an annular groove formed in the inner surface of an opening of the housing or an opening of the sleeve to which the valve spool is slidably engaged, a passage portion having the cross sectional area which is gradually and downstream enlarged is structured such that the outer diameter of the outer surface of the valve spool is gradually and downstream enlarged, and the outer surface portion is formed into a tapered surface in the axial direction.

According to an eighth aspect of the present invention, there is an emergency accumulator; and a dump valve arranged to be opened in an emergency so as to introduce pressure accumulated in the accumulator into a power pressure chamber, wherein a throttle is provided for a passage formed from the accumulator to the dump valve.

According to a ninth aspect of the present invention, there is an emergency accumulator; and a dump valve arranged to be opened in an emergency so as to introduce pressure accumulated in the accumulator into a power pressure chamber, wherein a housing is formed by joining a front body and a rear cover, the dump valve is inserted into a valve hole formed in the front body, and the dump valve is abutted against an end surface of the rear cover so that separation of the dump valve is performed.

Each of the hydraulic pressure boosting apparatuses having the above-mentioned structures in any one of the first aspect or the third aspect has the structure that the hydraulic fluid discharged from the pump is throttled in the two steps. That is, the hydraulic fluid is first throttled by the first throttle valve, and then throttled by the second throttle valve. Therefore, the overall velocity of the flow of the hydraulic fluid is smoothly changed. That is, rapid change can be prevented. As a result, fluid flow noise which is caused from change in the velocity of the flow can be prevented. In particular the third aspect and the fifth aspect of the present invention have the structure that the cross sectional area of the passage in the first throttle valve, which throttles the hydraulic fluid, is gradually enlarged. Therefore, change in the velocity of the hydraulic fluid can furthermore be moderated. Therefore, fluid flow noise can furthermore effectively be prevented. Since the hydraulic fluid is then throttled by the second throttle valve, fluid flow noise can furthermore effectively be prevented.

The fourth aspect or the seventh aspect of the present invention have the structure that the cross sectional area of the throttle valve is gradually enlarged. Therefore, change in the velocity of the flow can be moderated when the hydraulic fluid has been throttled by the throttle valve. Therefore, fluid flow noise can effectively be prevented.

As described above, the hydraulic pressure boosting apparatus according to the present invention has the structure that the hydraulic fluid is throttled in two-step throttling manner. Therefore, the overall velocity of the flow of the hydraulic fluid can smoothly be changed. As a result, fluid flow noise caused from change in the velocity of the flow can be prevented.

The hydraulic pressure boosting apparatus according to the present invention has the structure that the cross sectional area of the passage in the throttle valve is gradually enlarged. Therefore, change in the velocity of the flow in the foregoing portion can be moderated. Thus, fluid flow noise can effectively be prevented.

The eighth aspect of the present invention has the structure that when the dump valve has been opened in an emergency, the hydraulic fluid in the accumulator is allowed to pass through the throttle so that the velocity of the flow is reduced. Then, the hydraulic fluid is allowed to pass through the dump valve, and then supplied to the power pressure chamber. Since the velocity of the flow in the dump valve is low, noise of the flow of the fluid can be prevented.

The ninth aspect of the present invention has the structure that the dump valve is inserted into a valve opening provided for the front body. Thus, the hydraulic pressure in the accumulator causes a pressure for removing the dump valve from the valve opening to always be applied. Since the dump valve is in contact with the end surface of the rear cover, separation can be prevented.

As described above, according to the present invention, the hydraulic booster comprises the emergency accumulator; and the dump valve arranged to be opened in an emergency so as to introduce pressure accumulated in the accumulator into the power pressure chamber, wherein the throttle is provided for the passage formed from the accumulator to the dump valve. Therefore, the velocity of the flow of the fluid which flows through the dump valve can be reduced. As a result, noise of the flow of the fluid can be prevented.

The ninth aspect of the present invention has the structure that the housing of the accumulator is formed by joining the front body and the rear cover, the dump valve is inserted into the valve hole formed in the front body, and the dump valve is abutted against the end surface of the rear cover. Therefore, separation of the dump valve from the valve hole can be prevented.

DETAILED DESCRIPTION OF THE PREFERRED EMBODIMENTS

Embodiments of the present invention will now be described with reference to the drawings.

Figure 1:
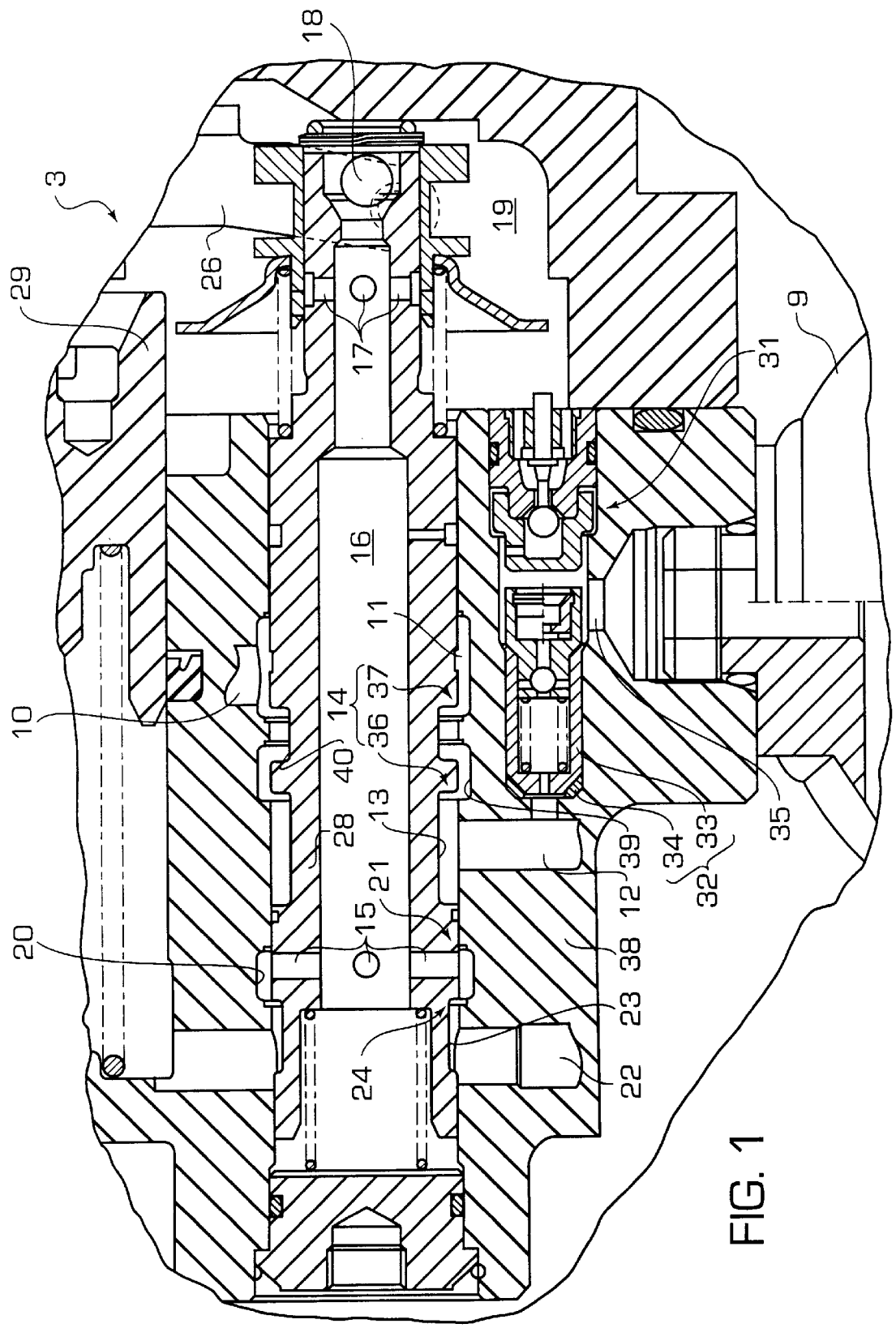
FIG. 1 is a cross sectional view showing a portion of a first embodiment of a hydraulic pressure boosting apparatus according to the present invention.

FIG. 1 shows a portion of a first embodiment of an application of a hydraulic pressure boosting apparatus according to the present invention to a brake booster. Note that the same elements as those of the above-mentioned structure are given the same reference numerals and the same elements are omitted from detailed description.

[First Embodiment]

Figure 6:
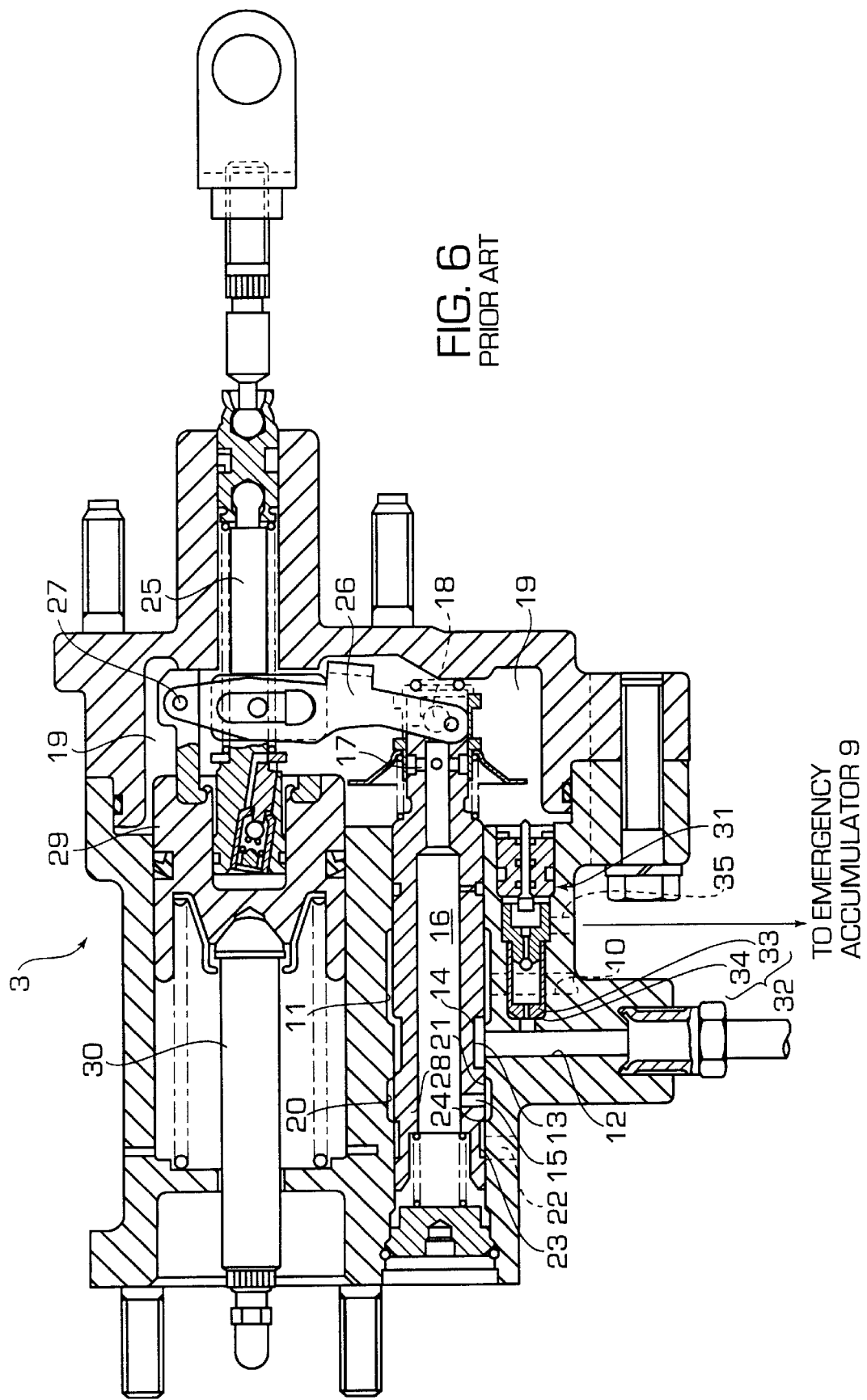
FIG. 6 is a diagram showing an example of a conventional open center type hydraulic brake booster.

As shown in FIG. 1, a booster 3 according to the first embodiment has a structure that a return valve 14 is formed into a two-step throttle composed of a first throttle valve 36 and a second throttle valve 37 formed continuously from the first throttle valve 36. Specifically, a fifth annular groove 39 is formed in an opening of a housing 38 disposed between a first annular groove 11 and an opening of an inlet passage 12. Moreover, a sixth annular groove 40 adjacent to a second annular groove 13 is formed in the outer surface of a valve spool 28. The second annular groove 13 and the fifth annular groove 39 constitute the first throttle valve 36. Moreover, the sixth annular groove 40 and the first annular groove 11 constitute the second throttle valve 37. As compared with return valve 1 of the conventional booster 3, an amount of throttle (that is, a throttling ratio) of the first throttle valve 36 with respect to the same distance of forward movement of the valve spool 28 is reduced. Moreover, the total amount of throttle of the first and second throttle valves 36 and 37 is made to be the same as that of the return valve 14 of the conventional booster 3. The other structures of the booster 3 according to the first embodiment are the same as those of the conventional structure shown in FIG. 6.

In the booster 3 structured as described above and according to the first embodiment, when the valve spool 28 has been moved forwards when the operation is performed, a gap of the first throttle valve 36 is reduced. Also a gap of the second throttle valve 37 is reduced. Therefore, hydraulic fluid discharged from the pump 6 is throttled by the first throttle valve 36, and then throttled by the second throttle valve 37. That is, the hydraulic fluid is throttled in two steps. Since the throttling ratio of the first throttle valve 36 is small as compared with the conventional structure, change in the velocity of the flow occurring when the hydraulic fluid is throttled by the first throttle valve 36 is prevented as compared with the conventional structure. Since the hydraulic fluid is furthermore throttled by the second throttle valve 37, hydraulic pressure which is substantially the same as that generated by the conventional structure can be generated in the second annular groove 13 even if the distance of the forward movement of the valve spool 28 is the same. The generated hydraulic pressure is applied to a power house 19 similarly to the conventional structure so that the booster 3 is operated.

As described above, the hydraulic fluid discharged from the pump 6 is first throttled by the first throttle valve 36, and then throttled by the second throttle valve 37. Therefore, the overall velocity of the flow of the hydraulic fluid can smoothly be changed without rapid changed. As a result, fluid flow noise caused from change in the velocity of the flow can be prevented.

The other operations and effects of the booster 3 according to the first embodiment are the same as those of the conventional structure.

[Second Embodiment]

Figure 2:
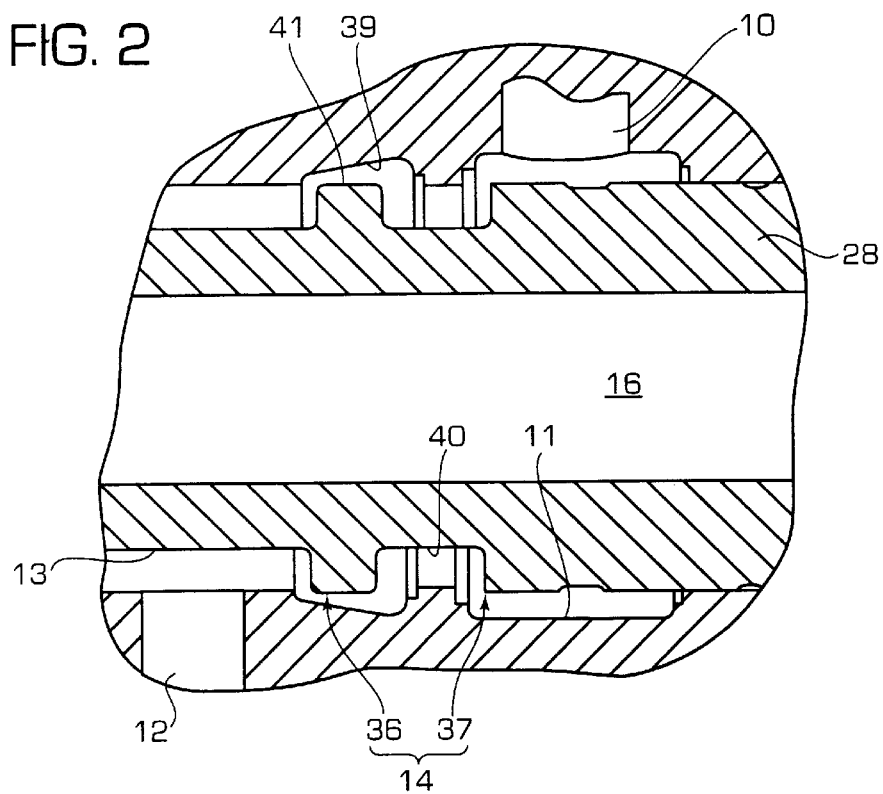
FIG. 2 is a cross sectional view showing a portion of a second embodiment of the present invention.

FIG. 2 is a diagram showing a portion of a second embodiment of the present invention.

The first embodiment has a structure that the inner diameter of a bottom portion of the fifth annular groove 39 is constant in the axial direction. However, a booster 3 according to the second embodiment has a structure that the inner diameter of the bottom portion of the fifth annular groove 39 is gradually and downstream (that is, toward right-hand portion in FIG. 2) enlarged. That is, the surface of the bottom portion of the fifth annular groove 39 is formed into a tapered surface which is inclined downstream in the axial direction.

The other structures of the booster 3 according to the second embodiment are the same as those of the first embodiment.

In the booster 3 having the above-mentioned structure and according to the second embodiment, when the hydraulic fluid has been throttled by the first throttle valve 36 when the booster 3 is operated, the cross sectional area of the passage in the first throttle valve 36 is gradually enlarged. That is, the cross sectional area of the passage is gradually enlarged so that the change in the velocity of the flow is furthermore moderated. Moreover, the hydraulic fluid is throttled by the second throttle valve 37. Therefore, fluid flow noise can furthermore effectively be prevented.

The other operations and effects of the booster 3 according to the second embodiment are the same as those of the first embodiment.

[Third Embodiment]

Figure 3:
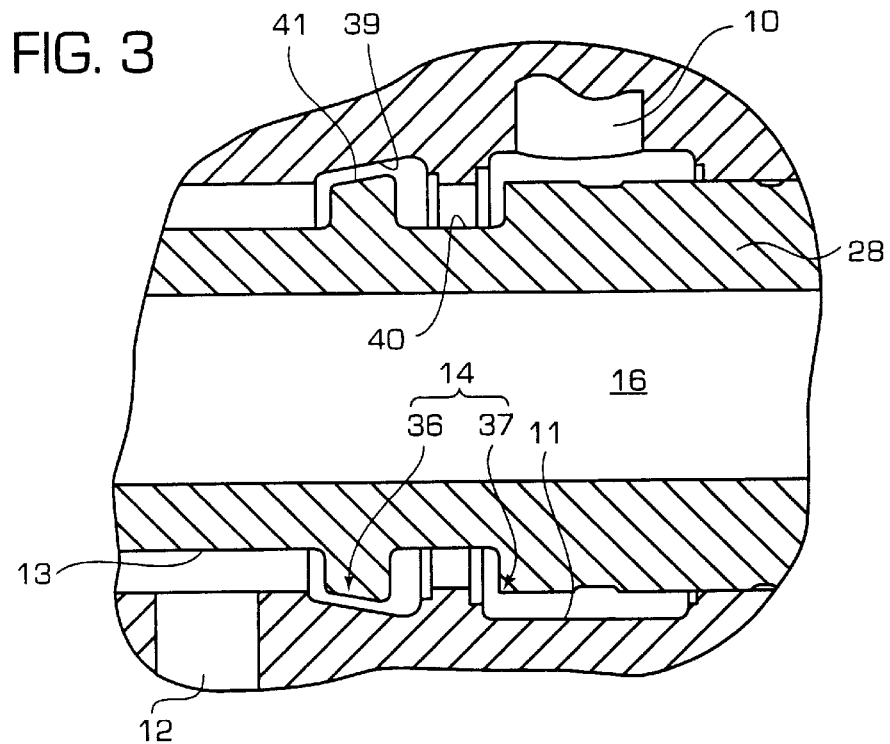
FIG. 3 is a cross sectional view showing a portion of a third embodiment of the present invention.

FIG. 3 is a diagram showing a portion of a third embodiment of the present invention.

In the second embodiment, the inner diameter of the brake pedal of the fifth annular groove 39 is gradually and downstream enlarged. Moreover, an outer surface 41 of the valve spool 28 opposite to the fifth annular groove 39 has the same outer diameter in the axial direction. A booster 3 according to the third embodiment has a structure that the inner diameter of the brake pedal of the fifth annular groove 39 is gradually and downstream enlarged. Also the outer diameter of the outer surface 41 is gradually and downstream enlarged. That is, also the outer surface 41 is formed into a tapered surface which is inclined in the axial direction. In the foregoing case, the taper angle of the outer surface 41 is smaller than that of the brake pedal of the fifth annular groove 39. Thus, the area of the passage in the foregoing portion is moderately and greatly changed.

The other structures, operations and effects of the booster 3 according to the third embodiment are the same as those of the second embodiment.

[Fourth Embodiment]

Figure 4:
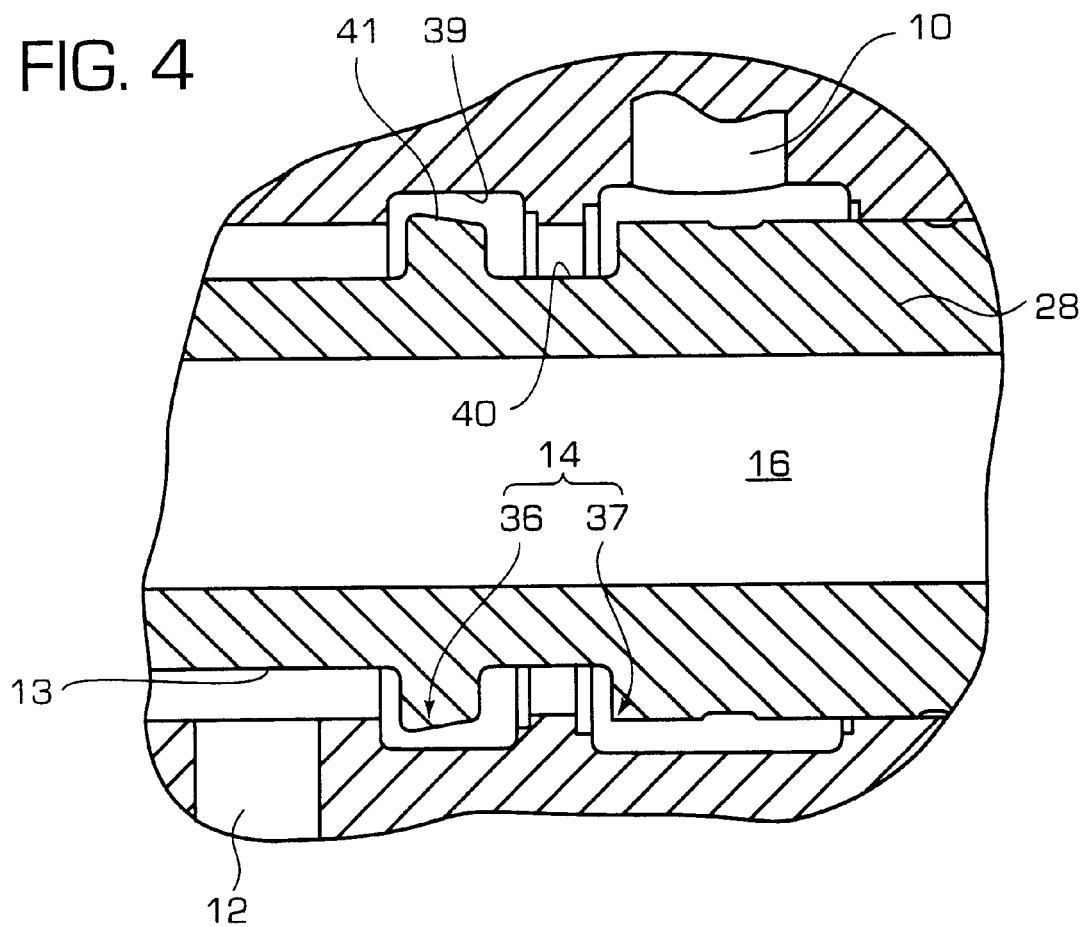
FIG. 4 is a cross sectional view showing a portion of a fourth embodiment of the present invention.
Figure 5:
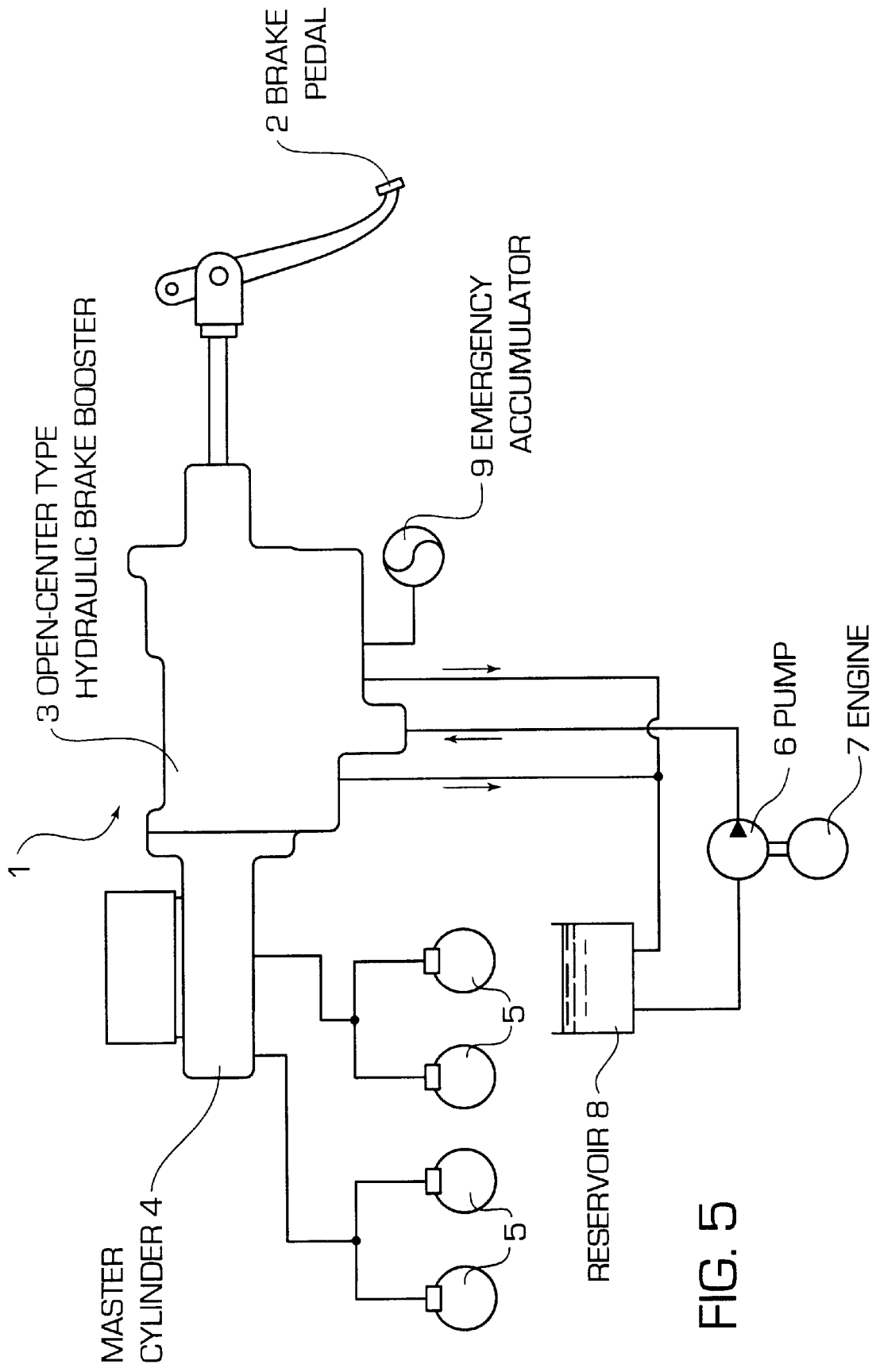
FIG. 5 is a diagram showing an example of a conventional hydraulic pressure boosting system.

FIG. 4 is a diagram showing a portion of a fourth embodiment of the present invention.

In the second embodiment, the inner diameter of the fifth annular groove 39 is gradually and downstream enlarged. A booster 3 according to the fourth embodiment has a structure that the inner diameter of the fifth annular groove 39 is made to be constant. Moreover, the outer diameter of an outer surface 41 of a valve spool 28 is gradually and downstream reduced. Thus, the surface of the brake pedal is formed into a tapered surface which is inclined in the axial direction. Therefore, also the fourth embodiment has the structure that the area of the passage in the foregoing portion is moderately enlarged.

The other structures, operations and effects of the booster 3 according to the fourth embodiment are the same as those of the second embodiment.

In each of the above-mentioned embodiments, the valve spool 28 is slidably and directly engaged to the opening of the housing 38. However, another structure maybe employed in which the sleeve is engaged and secured to the opening of the housing 38 and the valve spool 28 is slidably engaged to the opening of the sleeve.

[Fifth Embodiment]

Figure 7:
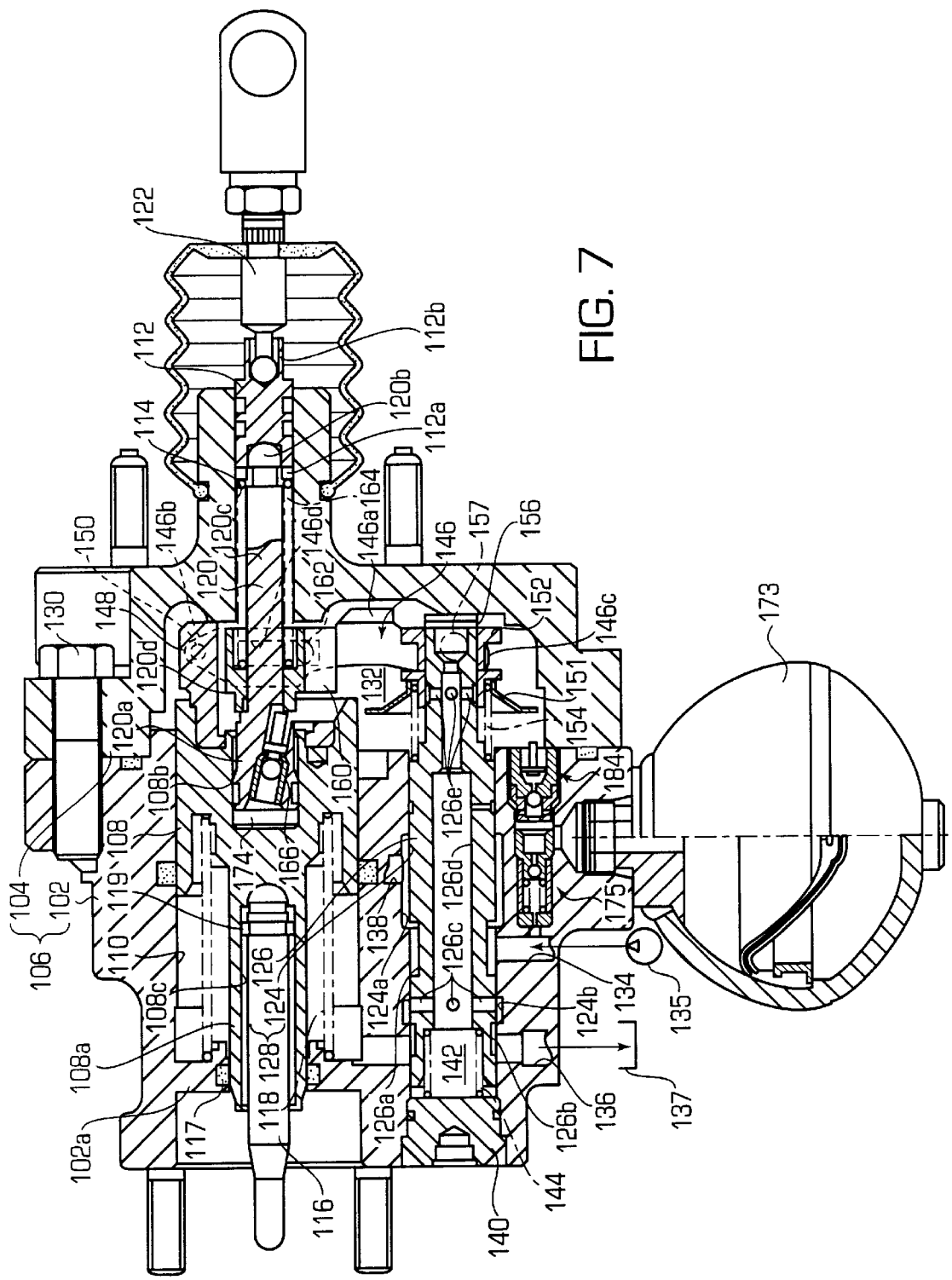
FIG. 7 is a vertical cross sectional view showing a hydraulic booster according to an embodiment of the present invention.

A fifth embodiment of the present invention will now be described. FIG. 7 is a vertical cross sectional view showing the overall body of a hydraulic booster according to a fifth embodiment of the present invention. In a housing 106 formed by causing a front body 102 (disposed on the left side in the drawing) and a rear cover 104 to abut against each other, a large-diameter power cylinder 110, to which a power piston 108 is movably engaged, and a small-diameter input cylinder 114, to which an input piston 112 is movably engaged, are disposed on the same axial line.

A large-diameter outer surface of the power piston 108 slides on the inner surface of the power cylinder 110. Moreover, a small-diameter cylindrical portion 108a is integrally formed at the axis of the power piston 108 so as to, through a seat member 117, slidably penetrate a front wall 102a of the front body 102 having the power cylinder 110 formed thereon. A push rod 116 is connected to an internal opening 108c of the small-diameter cylindrical portion 108a so as to transmit an output to a piston of a master cylinder (not shown). A return spring 118 for returning the power piston 108 to a non-operating position shown in the drawing is disposed between a front portion of the power piston 108 and the front wall 102a.

Figure 8:
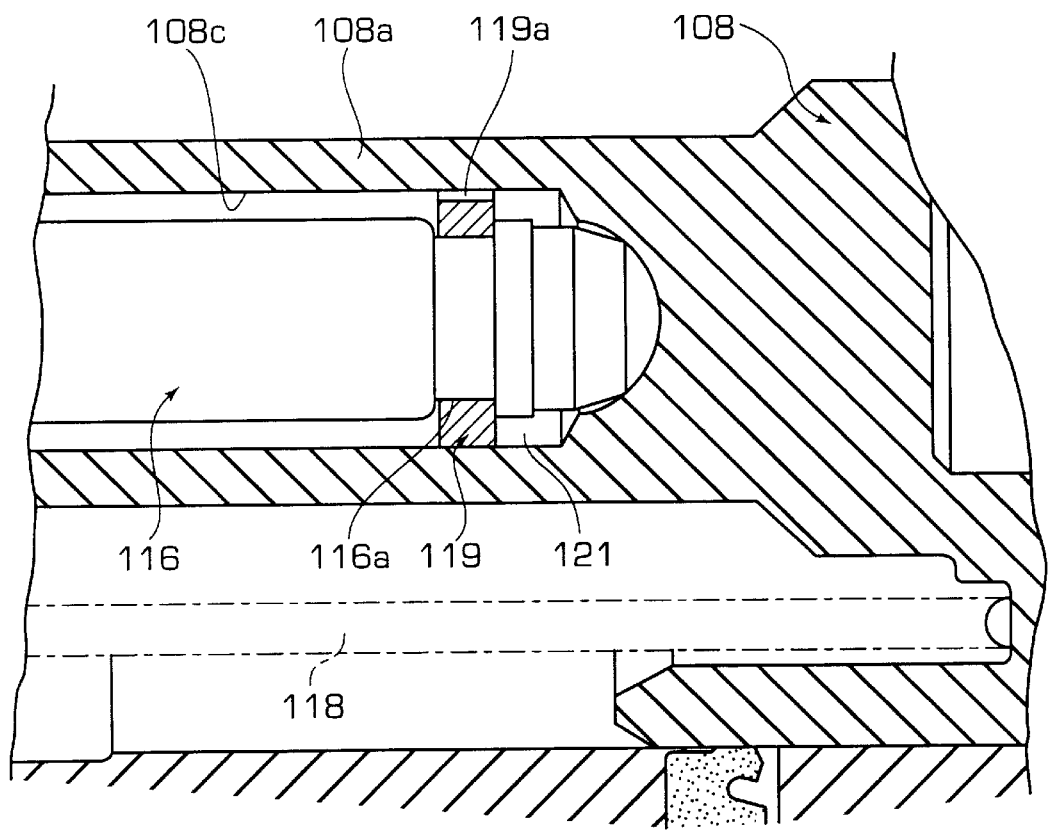
FIG. 8 is an enlarged view showing a portion for connecting a power piston and a push rod of the hydraulic booster to each other.
Figure 9:
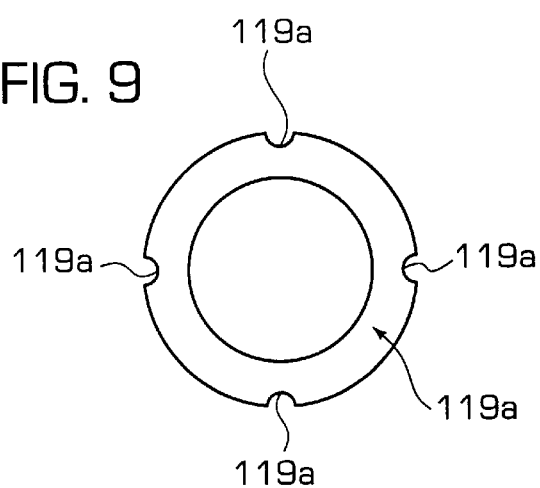
FIG. 9 is a front view showing a separation preventive member fit to the connection portion between the power piston and the push rod.

As described above, the push rod 116 is inserted into the internal opening 108c of the small-diameter cylindrical portion 108a. To prevent separation of the push rod 116 from the power piston 108, a separation preventive member 119 made of rubber is fit to the leading end of the push rod 116 (see FIGS. 8 and 9 showing the foregoing portion). The separation preventive member 119 is received in an annular groove 116a formed adjacently to an end of the push rod 116. Moreover, a plurality of communication grooves 119a in the axial direction are formed on the outer surface. The communication grooves 119a are formed as described above. Therefore, even if the outer surface of the separation preventive member 119 is pushed in a state in which the outer surface of the separation preventive member 119 is brought into hermetic contact with the small-diameter cylindrical portion 108a of the power piston 108 when the push rod 116 is joined to the power piston 108, a space 121 adjacent to the internal opening 108c of the small-diameter cylindrical portion 108a is not hermetically sealed. Therefore, the push rod 116 can smoothly be inserted.

A circular opening 108b is formed in a rear portion (in a right-hand portion in FIG. 7) of the power piston 108. A large-diameter leading end 120a of the input rod 120 is slidably engaged to the inside portion of the circular opening 108b. Another end 120b of the input rod 120 is secured to a front end 112a of the input piston 112 so as to integrally be moved. Another end 112b of the input piston 112 is connected to a brake pedal (not shown) through an operating rod 122. When the brake pedal is operated, the operating rod 122 and the input rod 120 are moved.

In the front body 102 of the housing 106, a valve hole 124 is formed in parallel with the power cylinder 110 and the input cylinder 114, which are disposed on the same axis. A spool 126 is slidably engaged to the inside portion of the valve hole 124 so that a spool valve (given reference numeral 128) is constituted. The housing 106 is formed by causing the front body 102 and the rear cover 104 to abut against each other and by securing with a bolt 130. A space between the body 102 and the rear cover 104, that is, a space between the power cylinder 110 and the input cylinder 114, and a space to the right of the valve hole 124 form a power pressure chamber 132 to be described later.

Two annular grooves 124a and 124b are formed in the inner surface of the valve hole 124. Also two annular grooves 126a and 126b are formed in the outer surface of the spool 126. The right-hand annular groove 126a formed in the spool 126 and shown in FIG. 7 is always connected to a discharge portion of a pump 135 through a discharge passage 134 formed in the housing 106 and opened in the valve hole 124. The left-hand annular groove 126b of the spool 126 is allowed to always communicate with a reservoir 137 through a reflux passage 136.

A wide annular groove 124*a* formed on the right side of the valve hole 124 is connected to the right-hand annular groove 126*a* which is always connected to the discharge portion of the pump 135 when the spool 126 is not operated (in a state shown in FIG. 7). When the spool 126 has been operated, a passage from the annular groove 126*a* is gradually throttled. Finally, the annular groove 124*a* is interrupted from the annular groove 126*a*. The annular groove 124*a* is always connected to a power steering (not shown) through a supply passage 138. Oil discharged from the pump 135 is refluxed to the reservoir 137 through a passage in a control valve when no operation is performed. When the steering wheel is operated, the passage in the control valve is throttled. Thus, pressure is generated so that a cylinder of the power steering is operated. Thus, wheels are steered. Although this embodiment is a system in which one pump 135 also serves as the open center type power steering, another system may be employed in which one pump is employed for only a brake. In the foregoing case, the right-hand annular groove 124*a* formed in the inner surface of the valve hole 124 of the spool valve 128 is required to directly be connected to the reservoir 137.

The annular groove 124*b* formed in the left portion of the inner surface of the valve hole 124 is allowed to communicate with an axial passage 126*d* in the spool 126 through the radial through hole 126*c* formed in the spool 126. The axial passage 126*d* is allowed to communicate with the inside portion of the power pressure chamber 132 through a radial through hole 126*e* formed in a portion projecting over the right-hand valve hole 124 of the spool 126.

A plug 140 is secured in the valve hole 124 at a position adjacent to an end (in the left portion in FIG. 7) opposite to the power pressure chamber 132. In a space between the plug 140 and the end of the spool 126, there is formed a chamber 142 allowed to communicate with the axial passage 126*d*. In the chamber 142, a spring 144 is disposed which always urges the spool 126 to the right-hand portion in FIG. 7. When the spool valve 128 is not operated, the right-hand end surface of the spool 126 is pushed by the spring 144 so as to be brought into contact with a wall of the power pressure chamber 132 in the housing 106, as shown in the drawing. When the operation is not performed, the right-hand annular groove 126*a* of the spool 126, into which hydraulic fluid discharged from the pump 135 is always introduced, and the wide annular groove 124*a* formed in the inner surface of the valve hole 124 connected to the reservoir 137 through the power steering are allowed to communicate with each other. The fluid discharged from the pump 135 is allowed to pass through the grooves 126*a* and 124*a* and the control valve of the power steering so as to be refluxed to the reservoir 137. The communication of the left annular groove 124*b* of the valve hole 124 with the right-hand annular groove 126*a* of the spool 126 is interrupted. Moreover, the annular groove 124*b* is also allowed to communicate with the annular groove 126*b* which is always connected to the reservoir 137 so that the power pressure chamber 132 is connected to the reservoir 137.

As described later, when the spool 126 has been moved to the left portion, a portion between the annular groove 126*a*, into which the fluid discharged from the pump 135 formed in the right-hand portion of the spool 126 has been introduced, and the annular groove 124*a* connected to the reservoir 137 through the right-hand power steering of the valve hole 124 is gradually throttled. Moreover, a space between the left annular groove 124*b* of the valve hole 124 and the annular groove 126*b* allowed to communicate with the left reservoir 137 of the spool 126 is closed. When the spool 126 is furthermore moved to the left, the annular groove 126*a* connected to the right-hand pump 135 of the spool 126 and the annular groove 124*b* connected to the left power pressure chamber 132 of the valve hole 124 are allowed to communicate with each other. Thus, the fluid discharged from the pump 135 is introduced into the power pressure chamber 132.

The power piston 108, the input rod 120 and the spool 126 are connected to one another through a lever 146 disposed in the power pressure chamber 132 such that the operation is permitted. The lever 146 is composed of two plates (disposed on this side and in the inner portion of the surface of FIG. 7) disposed on the two sides of the input rod 120 and the spool 126 and joined to each other through a horizontal plate 146*a*. A stopper member 148 for stopping rearward movement of the power piston 108 is joined to an end surface of the rear portion (the right-hand portion of FIG. 7) of the power piston 108. An upper end 146*b* of the lever 146 is connected to the stopper member 148 through a first connection pin 150.

A bevel retainer 151 and a sleeve 152 are slidably engaged to an outer surface of a portion of the spool 126 projecting into the power pressure chamber 132. The retainer 151 and the sleeve 152 are urged to the right in FIG. 7 by a spring 154 disposed between the inner surface of the retainer 151 and a stepped portion provided for the outer surface of the spool 126. An end (the right-hand end) of the sleeve 152 is in contact with a stopper ring 156 disposed around an end of the spool 126 so that the end is stopped. A lower end 146*c* of the lever 146 is connected to the outer surface of the sleeve 152 through a second connection pin 157. When the lower end 146*c* of the lever 146 is swung, the retainer 151 and the sleeve 152 are moved forwards or rearwards. When a usual operation is performed, the retainer 151, the sleeve 152 and the spool 126 are integrally moved owning to swing of the lever 146. When the spool 126 has been moved to the left in FIG. 7 until it is stopped because of contact with the plug 140, the retainer 151 and the sleeve 152 are moved along the outer surface of the spool 126.

An intermediate plate 160 is disposed on the inside of the lever 146 disposed on the two sides of the input rod 120. The two side portions of the intermediate plate 160 are disposed between the two side walls of the lever 146 and the input rod 120. Moreover, the input rod 120 penetrates a portion between the two side portions. Third connection pins 162, each of which is joined to each of the two side portions of the intermediate plate 160, are engaged to the inside portion of an elongated grooves 146*d* formed in the two side walls of the lever 146. A compressed spring 164 is disposed between the inside portion of the intermediate plate 160 and the input piston 112. Thus, the intermediate plate 160 is, by the spring 164, urged toward the leading end 120*a* of the input rod 120. The large-diameter leading end 120*a* of the input rod 120 has a diameter larger than that of another portion (a shaft portion) 120*c*. When a usual operation is performed, the intermediate plate 160 is pressed against the stepped portion 120*d* between the large-diameter leading end 120*a* and the small-diameter 120*c* of the input rod 120.

Figure 10:
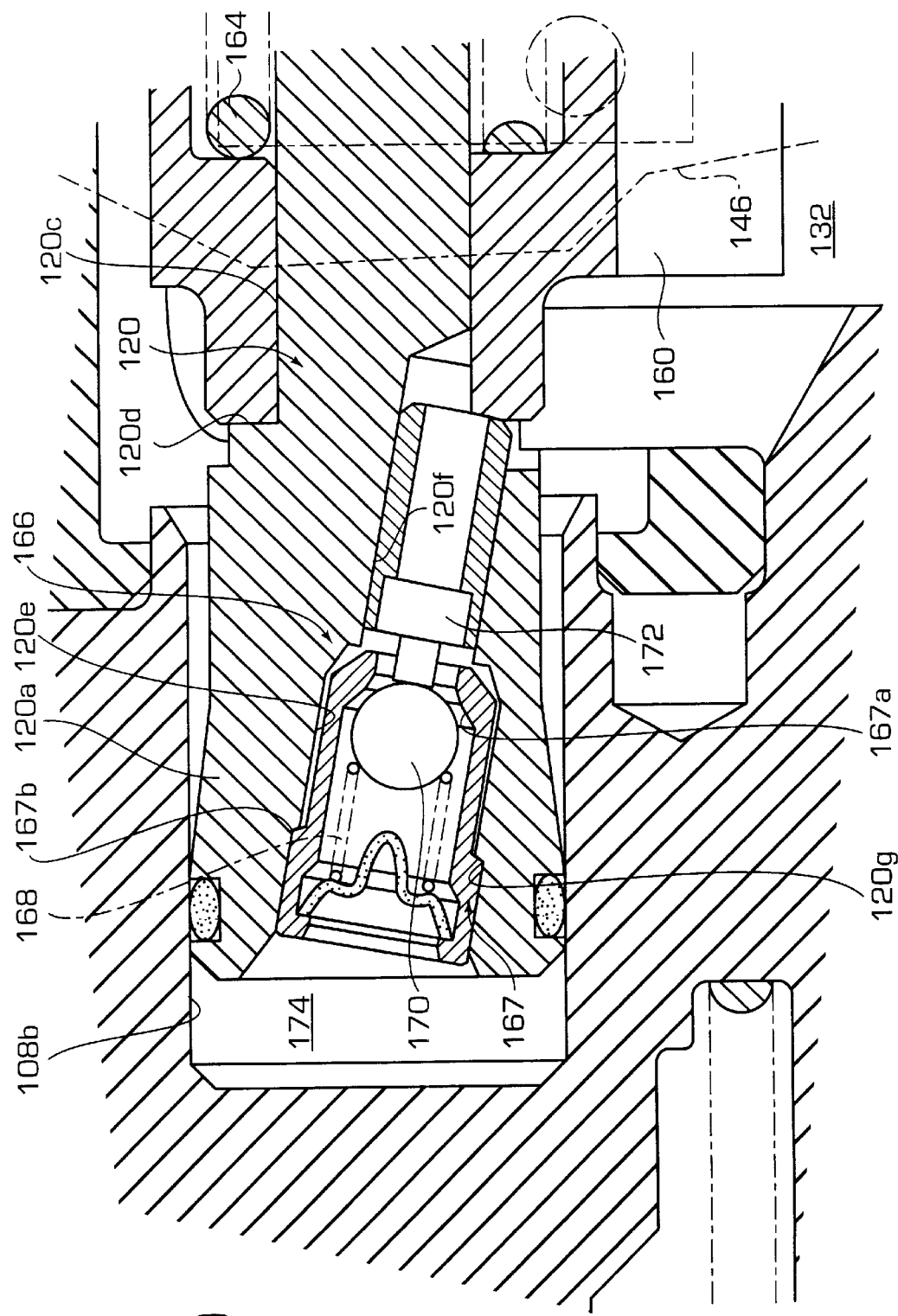
FIG. 10 is an enlarged view showing a travel limiter of the hydraulic booster.

As described above, the circular opening 108*b* is formed in the rear portion of the power piston 108. The large-diameter leading end 120*a* formed at the leading end of the input rod 120 is engaged to the inside portion of the circular opening 108*b*. A travel limiter 166 is provided for the inside portion of the large-diameter leading end 120*a* of the input rod 120. The travel limiter 166 will now be described with reference to FIG. 10 which is an enlarged view. Passage holes 120*e* and 120*f* are formed which diagonally penetrate a portion between the leading end surface of the large-diameter leading end 120a of the input rod 120 and the stepped portion 120d formed between the large-diameter leading end 120a and the small-diameter shaft 120c. The passage holes 120e and 120f consist of the large diameter passage opening 120e formed in the leading end portion of the input 120 and the small-diameter opening 120f formed adjacent to the stepped portion 120d. A cylindrical portion 167 is press-fit into the large-diameter hole 120e. A valve seat 167a is formed on the inner surface of a bottom portion (adjacent to the small-diameter opening 120f) of the cylindrical portion 167. Thus, a valve member (a ball) 170 pressed by the spring 168 disposed adjacent to the leading end of the input rod 120 is seated.

A small stepped portion 120g is formed on the inner surface of the large-diameter opening 120e. On the other hand, also a small stepped portion 167b is formed on the outer surface of the cylindrical portion 167. The cylindrical portion 167 is secured in a state in which the small stepped portion 167b of the cylindrical portion 167 is in contact with the small stepped portion 120g of the large-diameter passage opening 120e. In a state in which the cylindrical portion 167 has been secured to the input rod 120, a gap is formed between the outer surface of a portion of the cylindrical portion 167 which is inner than the small stepped portion 167b and a portion of the passage opening 120e which is inner than the small stepped portion 120g of the large-diameter opening 120e. Thus, undesirable contact can be prevented.

A plunger (a pin for pressing the ball 170) 172 is inserted into the small-diameter opening 120f of the passage hole. In a usual case, the plunger 172 pressed by the intermediate plate 160 upwards pushes the ball 170. Thus, the power pressure chamber 132 and the chamber 174 in the circular opening 108b provided for the power piston 108 are communicated with each other. When the intermediate plate 160 has been separated from the stepped portion 120d of the input rod 120, the plunger 172 which has upwards pushed the ball 170 is moved rearwards. Thus, the ball 170 is seated in the valve seat 167a in the cylindrical portion 167. Thus, the chamber 174 in the power piston 108 is interrupted from the power pressure chamber 132 and thus the same is hermetically sealed. When the chamber 174 has been brought to the hermetically sealed state as described above, an input to the input rod 120 is directly transmitted to the power piston 108.

Moreover, an emergency accumulator 173 is connected to the above-mentioned hydraulic booster. The hydraulic booster according to this embodiment is an open center type booster which uses pressure which is discharged from the pump and which is generated when the brake is operated so as to perform the boosting operation of the booster. Therefore, if the pump 135 is broken, no pressure which must be discharged from the pump cannot be generated. Therefore, there is apprehension that the boosting function of the booster cannot be obtained. Therefore, the pressure which is generated when the booster is operated and which must be discharged from the pump is previously accumulated in the emergency accumulator 173. In an emergency, for example, breakdown of the pump or the like, the accumulated pressure is discharged so that the boosting operation is performed. Therefore, the emergency accumulator 173 is provided with the charge valve 175 for accumulating pressure and a dump valve 184 which is opened when the pump 135 is, for example, broken and which discharged the pressure accumulated in the emergency accumulator 173 to the power pressure chamber 132.

Figure 11:
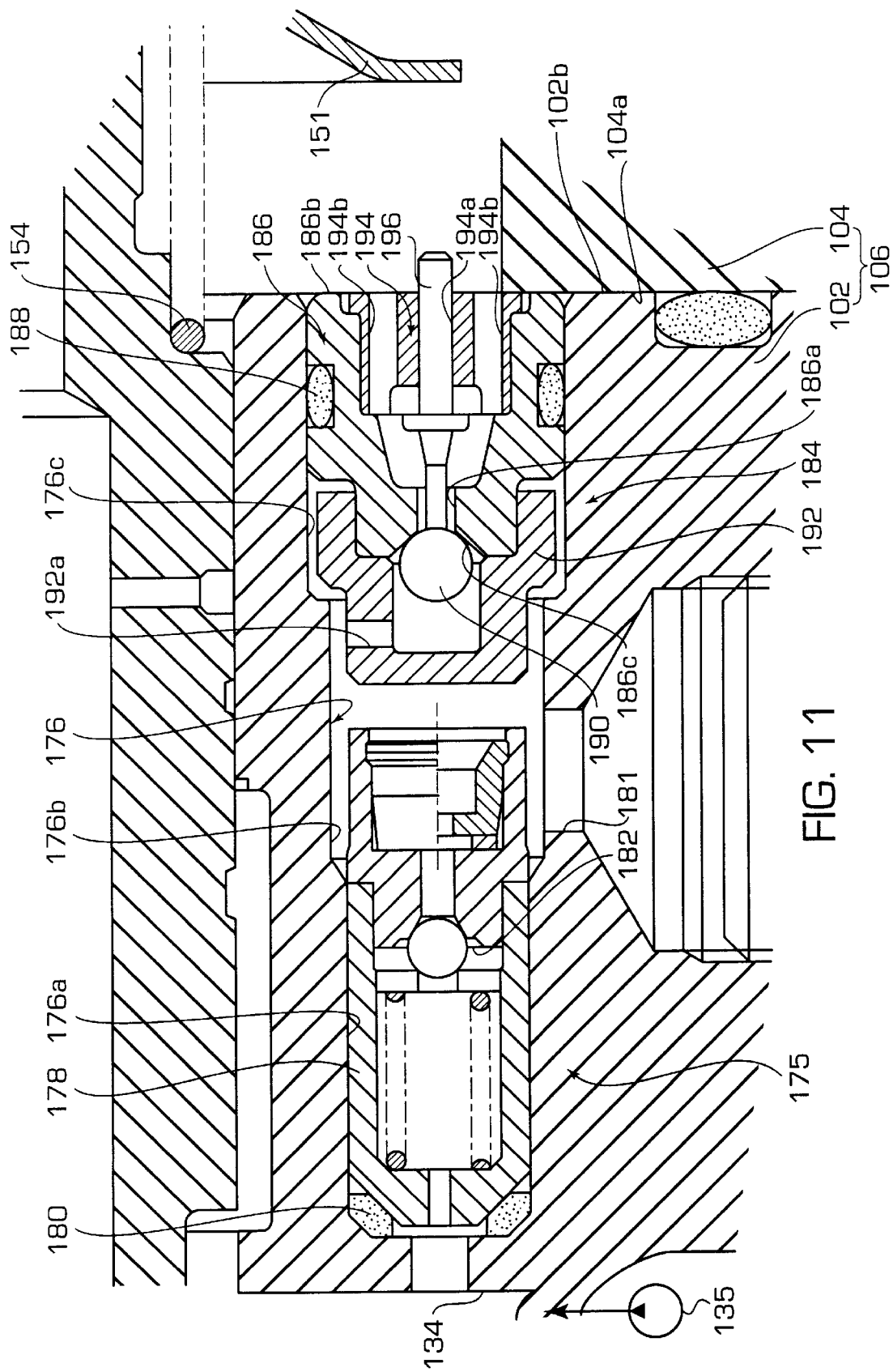
FIG. 11 is an enlarged view showing a dump valve and a charge valve of the hydraulic booster.
Figure 12:
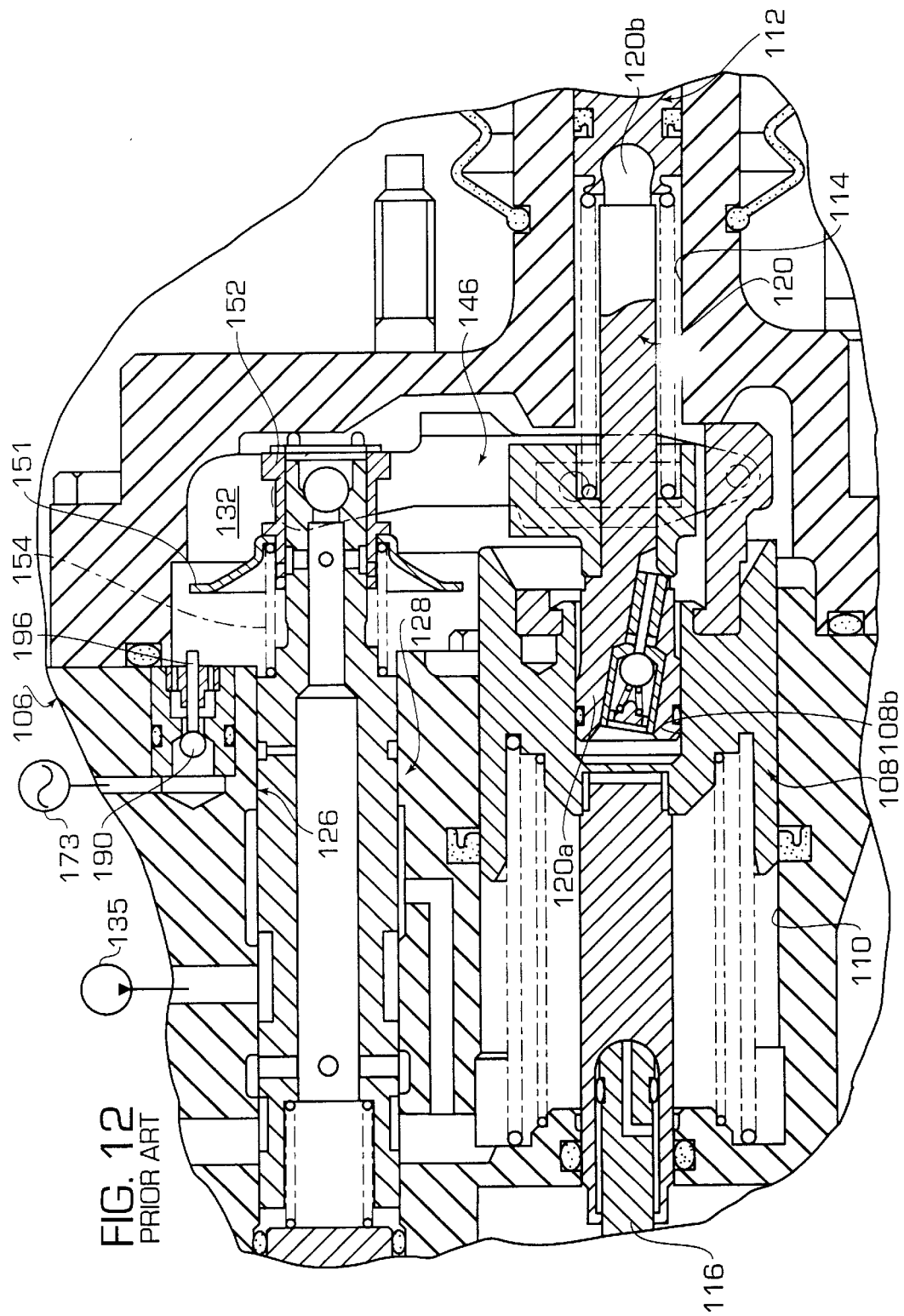
FIG. 12 is a vertical cross sectional view showing an essential portion of a conventional hydraulic booster.

As shown in FIG. 11 which is an enlarged view, the charge valve 175 is provided in a stepped hole 176 for communicating the discharge passage 134 formed in the housing 106 (the front body 102) and the power pressure chamber 132. A cylindrical valve body 178 is slidably engaged to the inside portion of a small-diameter portion 176a of the stepped hole 176. An annular rubber seat 180 is secured to the portion of the stepped hole 176 adjacent to the inlet portion (adjacent to the discharge passage 134). In an emergency, the valve body 178 is seated on the rubber seat 180 so that the pump 135 and the emergency accumulator 173 are interrupted from each other. When pressure has been discharged in the discharge portion of the pump 135, the pressure causes the valve body 178 to be separated from the rubber seat 180 and moved to the right. As a result, hydraulic fluid discharged from the pump 135 is allowed to pass through the gap on the outer surface of the valve body 178 and a passage 181 so as to be supplied to the emergency accumulator 173 so as to be accumulated in the same. Note that a relief valve 182 is disposed in the charge valve 175. If the pressure accumulated in the emergency accumulator 173 is raised excessively, the relief valve 182 is opened so that the accumulated pressure is lowered.

The dump valve 184 is provided for the large-diameter portion 176c of the stepped hole 176 adjacent to the power pressure chamber 132 so as to be opened in an emergency and arranged to discharge the pressure in the emergency accumulator 173 into the power pressure chamber 132. A seat member 186 having a passage hole 186a penetrating the central portion is press-fit and secured to a portion in an opening of the large-diameter portion 176c of the stepped hole 176 adjacent to the power pressure chamber 132. An O-ring 188 is disposed around the seat member 186 so as to maintain the hermetic sealing between the portion adjacent to the emergency accumulator 173 and the portion adjacent to the power pressure chamber 132. The end surface (a right-hand end surface shown in FIG. 11) 186b of the seat member 186 press-fit and secured to the inside portion of the stepped hole 176 is made to substantially coincide with the end surface 102b of the front body 102. Thus, the end surface is in contact with an end surface 104a of the rear cover 104 integrally secured to the front body 102. Thus, separation from the stepped hole 176 can be prevented.

A valve seat 186c is provided for an opening of the passage hole 186a formed in the seat member 186 at a position adjacent to an intermediate-diameter portion 176b. A ball valve 190 which can be seated on the valve seat 186c is disposed adjacent to the valve seat 186c. The ball valve 190 is accommodated in a cup-shape ball accommodating member 192 joined to the inner end of the seat member 186 so that separation is prevented. A gap is formed between the outer surface of the ball accommodating member 192 and the inner surface of the stepped hole 176. A radial throttling passage 192a for communicating the inner and outer portions with each other is provided for the side wall of the ball accommodating member 192.

An annular guide member 194 is secured to the inside portion of the seat member 186. A pin 196 for upwards pushing the ball valve 190 so as to open the dump valve 184 is slidably inserted into the guide hole 194a which penetrates the guide member 194. A leading end of the pin 196 is inserted into the passage hole 186a of the seat member 186 such that a gap is maintained. Another end of the pin 196 projects into the power pressure chamber 132. A through passage 194b which always communicates the passage hole 186a of the seat member 186 and the inside portion of the power pressure chamber 132 with each other is provided for the guide member 194. The dump valve 184 is structured such that the retainer 151 engaged to the outer surface of the spool 126 is moved to push the pin 196 so that the ball valve 190 is separated from the valve seat 186c and thus the ball valve 190 is opened.

The operation of the hydraulic booster having the above-mentioned structure will now be described. When the operation is not performed, the right-hand end of the spool 126 is in contact with the wall of the power pressure chamber 132 in the housing 106. Thus, the spool 126 is stopped. When the spool 126 is in the above-mentioned state, the annular groove 126a in the right-hand portion of the spool 126 and the annular groove 124a in the left-hand portion of the valve hole 124 are interrupted from each other. Moreover, the annular groove 124b in the left-hand portion of the valve hole 124 and the annular groove 126b in the left-hand portion of the spool 126 are communicated with each other. Therefore, the power pressure chamber 132 is communicated with the reservoir 137 through the radial through hole 126e of the spool 126 adjacent to the right-hand end of the same, the axial passage 126d in the spool 126, the radial through hole 126c in the left-hand portion of the spool 126, the annular groove 124b in the left-hand portion of the valve hole 124 and the annular groove 126b in the left-hand portion of the spool 126. The fluid discharged from the pump 135 is passed to the power steering (not shown) through the annular groove 126a in the right-hand portion of the spool 126, the annular groove 124a in the right-hand portion of the valve hole 124 and the supply passage 138 in the housing 106. Then, the fluid is passed through the passage in the control valve of the power steering so as to be refluxed to the reservoir 137.

When the brake pedal (not shown) is pressed and thus the operating rod 122 is moved forwards (to the left in FIG. 7), the input piston 112 connected to the operating rod 122 and the input rod 120 are integrally and forwards moved. When the input rod 120 has been moved forwards as described above, the lever 146 is rotated around the second connection pin 157 adjacent to the spool 126. Thus, the power piston 108 is moved forwards. Since the power piston 108 has been moved forwards, the push rod 116 is moved forwards so as to press the piston of the master cylinder. Thus, pressure is generated in the master cylinder. When generation of the pressure is started in the master cylinder, the forward movement of the power piston 108 is substantially prevented. Then, the lever 146 starts rotating around the first connection pin 150 adjacent to the power piston 108. Thus, the spool 126 is moved forwards to the left in the drawing through the sleeve 152 and the retainer 151. At this time, the spool 126 enlarges the stroke of the input rod 120 by dint of the lever ratio around the portion adjacent to the power piston 108 so that the spool 126 is moved.

When the spool 126 has been moved to the left in the drawing, the portion between the annular groove 126a of the spool 126 connected to the right pump 135 and the wide annular groove 124a of the valve hole 124 is throttled. Moreover, the space between the left annular groove 126b of the spool 126 and the left annular groove 124b of the valve hole 124 is closed. Then, the passage between the right annular groove 126a of the spool 126 and the left annular groove 124b of the valve hole 124 is opened. When the movement of the spool 126 has switched the passage as described above, the fluid discharged from the pump 135 generates pressure. Thus, the fluid discharged from the pump 135 is introduced into the power pressure chamber 132 through the right annular groove 126a of the spool 126, the left annular groove 124b of the valve hole 124, the radial through hole 126c of the spool 126, the axial passage 126d and the radial through hole 126e of the spool 126 formed in the right hand portion.

The pressure supplied to the power pressure chamber 132 pushes the power piston 108 to the left. Thus, the force of the push rod 116 for pushing the piston of the master cylinder is boosted. The pressure in the power pressure chamber 132 acts as the force for pushing the power piston 108 to the left and the input rod 120 to the right. In a state (an intermediate load state) in which the pressure in the power pressure chamber 132 and the input from the brake pedal have been balanced with each other, the spool 126 is balanced. Therefore, the lever 146 is rotated around the second connection pin 157 adjacent to the spool 126. As a result, the pressure in the power pressure chamber 132 is made to correspond to the input. Thus, the boosting operation is performed in the intermediate load state. At this time, the power piston 108 enlarges the stroke of the input rod 120 and moved at the lever ratio around the portion adjacent to the spool 126. The pressure generated in the fluid discharged from the pump causes the charge valve 175 to be opened. Thus, the fluid discharged from the pump is supplied to the accumulator 173 so as to be accumulated.

Then, a state is realized in which the input from the brake pedal has been enlarged and thus the pressure in the power pressure chamber 132 is not raised furthermore. That is, a state is realized in which the left-hand end of the spool 126 is brought into contact with the plug 140 and the passage between the right annular groove 126a of the spool 126 and the right annular groove 124a of the valve hole 124 has completely be closed (the foregoing state is called a "full load point"). In this state, only the input rod 120 is moved forwards. When only the input rod 120 has been moved forwards, the third connection pin 162 causes the intermediate plate 160 connected to the lever 146 to be separated from the stepped portion 120d of the input rod 120. Thus, the plunger 172 which has been pushed by the intermediate plate 160 and which has upwards pushed the ball 170 is moved rearwards. Therefore, the ball 170 is seated on the valve seat 167a in the cylindrical portion 167. As a result, the chamber 174 between the leading end surface of the input 120 and the circular opening 108b of the power piston 108 is interrupted from the power pressure chamber 132 so that the hermetically sealed state is realized. Then, the force added to the input rod 120 is directly added to the power piston 108. That is, the output is enlarged to correspond to the enlargement of the input after the full load point.

When the brake pedal has been released in the above-mentioned operating state, the input rod 120 is moved rearwards. Thus, the lever 146 is rotated counterclockwise around the first connection pin 150 adjacent to the power piston 108 so as to move the spool 126 to the right in FIG. 7. The movement of the spool 126 causes the passage between the annular groove 126a connected to the right-hand pump 135 of the spool 126 and the annular groove 124b of the valve hole 124 allowed to communicate with the left-hand power pressure chamber 132 to be closed. The passage between the left-hand annular groove 124b of the valve hole 124 and the annular groove 126b of the spool 126 connected to the left-hand reservoir 137 is opened. Thus, the gap between the right-hand annular groove 126a of the spool 126 and the right-hand annular groove 124a of the valve hole 124 is enlarged. As a result, the pressure which has been introduced into the power pressure chamber 132 is passed through the passages 126e, 126d and 126c in the spool 126 and the annular grooves 124b and 126b, and then discharged to the reservoir 137.

When the pressure in the power pressure chamber 132 has been discharged to the reservoir 137, the power piston 108 is moved rearwards so as to be refluxed to the non-operating position shown in FIG. 7. Moreover, the passage between the right-hand annular groove 126a of the spool 126 and the right-hand annular groove 124a of the valve hole 124 is enlarged so that the original state is realized. Therefore, the pressure which has been generated by dint of throttling of the passage is eliminated. Thus, the fluid discharged from the pump 135 is passed through the control valve of the power steering so as to be refluxed to the reservoir 137 as it is. At this time, the charge valve 175 of the emergency accumulator 173 is closed so that the pressure accumulated in the emergency accumulator 173 is maintained.

In a state where the pump 135 has been broken, the pressure is not supplied from the pump 135 to the power pressure chamber 132 even if the brake pedal is pressed to forwards move the input rod 120 so as to move the spool 126 to the left in FIG. 7 and switch the passage in the spool valve 128. If the spool 126 cannot furthermore be moved in the forward direction after the full stroke of the spool 126, the rotation of the lever 146 causes the sleeve 152 and the retainer 151 to compress the spring 154 and move forwards. Initially, the radial through hole 126e which has communicated the axial passage 126d in the spool 126 and the inside portion of the power pressure chamber 132 with each other is closed by the sleeve 152. When the sleeve 152 and the retainer 151 are furthermore be moved in the forward direction, the retainer 151 is brought into contact with the pin 196 of the dump valve 184 so that the pin 196 is pushed. When the pushed pin 196 is moved, the ball valve 190 is separated from the valve seat 186c so that the dump valve 184 is opened. As a result, the pressure accumulated in the emergency accumulator 173 is passed through the radial throttling passage 192a provided for the ball accommodating member 192, the gap between the ball valve 190 and the valve seat 186c, the passage hole 186a of the seat member 186 and the through passage 194b of the guide member 194, and then supplied to the power pressure chamber 132. Thus, the boosting operation is started.

The dump valve 184 according to this embodiment has the structure that the throttling passage 192a is formed upstream of the dump valve 184, that is, formed at a position from the emergency accumulator 173. Therefore, the hydraulic fluid which is supplied from the emergency accumulator 173 to the power pressure chamber 132 is throttled so that the velocity of the flow is reduced. Then, the hydraulic fluid flows through the passage between the ball valve 190 and the valve seat 186c of the seat member 186. Therefore, noise of the flow of the fluid can be prevented.

What is claimed is:

1. A hydraulic pressure boosting apparatus comprising:
    an input shaft which is operated with operating force;
    an inlet passage through which hydraulic fluid discharged from a pump is passed;
    a circulating passage for circulating the hydraulic fluid to a reservoir;
    a power house into which the pressure of the hydraulic fluid is introduced when the operation of said boosting apparatus is performed;
    a power piston which is operated with the pressure in the power house and which produces an output;
    a return valve, the operation of which is controlled by dint of the operation of said input shaft, which freely passes the hydraulic fluid discharged form said pump and allowed to flow through said inlet passage to said circulating passage when the operation is not performed and which throttles a flow of the hydraulic fluid so as to generate a hydraulic pressure when the operation is performed; and
    a supply valve, the operation of which is controlled by dint of the operation of said input shaft, which interrupts said inlet passage from said power house when the operation is not performed and which supplies the hydraulic pressure generated by said return valve to said power house when the operation is performed; and
    a discharge valve, the operation of which is controlled by dint of the operation of said input shaft, which causes said power house to be communicated with said reservoir so as to discharge the hydraulic fluid in said power house when the operation is not performed and which interrupts said power house from said reservoir when the operation is performed so as to boost the operating force transmitted to said input shaft by dint of the hydraulic pressure introduced into said power house;
    wherein said return valve incorporates a first throttle valve and a second throttle valve so that two step throttling is performed such that said first throttle valve first throttles the flow of the hydraulic fluid after which said second throttle valve throttles the flow, said return valve comprises a spool valve, and each of said first and second throttle valves is constituted by an annular groove formed in an outer surface of said return valve and an annular groove formed in an inner surface of one of an opening of a housing and an opening of a sleeve in which said valve spool is slidably engaged.

2. A hydraulic pressure boosting apparatus according to claim 1, wherein a valve spool, the operation of which is controlled by dint of the operation of said input shaft, is slidably engaged to one of an opening in a housing and an opening of a sleeve engaged and secured to said opening of said housing, and each of said first throttle valve, said second throttle valve, said supply valve and said discharge valve is constituted by said valve spool and said housing or said sleeve to which said valve spool is slidably engaged.

3. A hydraulic pressure boosting apparatus according to claim 1, wherein said first throttle valve has a cross sectional area which is gradually enlarged in a downstream direction.

4. A hydraulic pressure boosting apparatus comprising:
    an input shaft which is operated with operating force;
    an inlet passage through which hydraulic fluid discharged from a pump is passed;
    a circulating passage for circulating the hydraulic fluid to a reservoir;
    a power house into which the pressure of the hydraulic fluid is introduced when the operation of said boosting apparatus is performed;
    a power piston which is operated with the pressure in the power house and which produces an output;
    a return valve, the operation of which is controlled by dint of the operation of said input shaft, which freely passes the hydraulic fluid discharged from said pump and allowed to flow through said inlet passage to said circulating passage when the operation is not performed and which throttles a flow of the hydraulic fluid so as to generate a hydraulic pressure when the operation is performed; and
    a supply valve, the operation of which is controlled by dint of the operation of said input shaft, which interrupts said inlet passage from said power house when the operation is not performed and which supplies the hydraulic pressure generated by said return valve to said power house when the operation is performed; and a discharge valve, the operation of which is controlled by dint of the operation of said input shaft, which causes said power house to be communicated with said reservoir so as to discharge the hydraulic fluid in said power house when the operation is not performed and which interrupts said power house from said reservoir when the operation is performed so as to boost the operating force transmitted to said input shaft by dint of the hydraulic pressure introduced into said power house;

wherein said return valve has a cross sectional area which is gradually enlarged in a downstream direction, said return valve incorporates a first throttle valve and a second throttle valve so that two step throttling is performed such that said first throttle valve first throttles the flow of the hydraulic fluid after which said second throttle valve throttles the flow, said return valve comprises a spool valve, and each of said first and second throttle valves is constituted by an annular groove formed in an outer surface of said return valve and an annular groove formed in an inner surface of one of an opening of a housing and an opening of a sleeve in which said valve spool is slidably engaged.

5. A hydraulic pressure boosting apparatus according to claim 4, wherein a valve spool, the operation of which is controlled by dint of the operation of said input shaft, is slidably engaged to an opening in a housing or an opening of a sleeve engaged and secured to said opening of said housing, and each of said throttle valve, said supply valve and said discharge valve is constituted by an annular groove formed in an outer surface of said valve spool and an annular groove formed in an inner surface of one of an opening of said housing and an opening of said sleeve to which said valve spool is slidably engaged, a passage portion having the cross sectional area which is gradually and downstream enlarged is structured such that the inner diameter of a bottom portion of said annular groove formed in the inner surface of the opening of said housing or the opening of said sleeve, and a surface of said bottom portion is formed into a tapered surface in the axial direction.

6. A hydraulic pressure boosting apparatus according to claim 5, wherein the outer diameter of a portion of the outer surface of said valve spool corresponding to said annular groove of the opening of said housing or the opening of said sleeve formed into the tapered surface is gradually and downstream enlarged, and the outer surface portion is formed into a tapered surface in the axial direction.

7. A hydraulic pressure boosting apparatus according to claim 4, wherein a valve spool, the operation of which is controlled by dint of the operation of said input shaft, is slidably engaged to an opening in a housing or an opening of a sleeve engaged and secured to said opening of said housing, and each of said supply valve and said discharge valve is constituted by an annular groove formed in an outer surface of said valve spool and an annular groove formed in an inner surface of one of an opening of said housing and an opening of said sleeve in which said valve spool is slidably engaged, a passage portion having the cross sectional area which is gradually and downstream enlarged is structured such that the outer diameter of the outer surface of said valve spool is gradually and downstream enlarged, and the outer surface is formed into a tapered surface in the axial direction.

8. A hydraulic booster comprising:

an emergency accumulator; and a dump valve arranged to be opened in an emergency so as to introduce pressure accumulated in said emergency accumulator into a power pressure chamber;

wherein a throttle is provided for a passage formed from said emergency accumulator to said dump valve, said dump valve incorporates a seat member including a passage, a ball valve which is seated on a valve seat of said seat member, a pin for upwardly moving said ball valve so as to separate said ball valve from said valve seat and an accommodating member received by said seat member and arranged to accommodate and hold said ball valve, and a throttle passage is provided for said accommodating member.

9. A hydraulic booster comprising;

an emergency accumulator; and a dump valve arranged to be opened in an emergency so as to introduce pressure accumulated in said emergency accumulator into a power pressure chamber;

wherein a housing is formed by joining a front body and a rear cover, said dump valve is inserted into a valve hole formed in said front body, and said dump valve is abutted against an end surface of said rear cover not to be removed from said valve hole of said front body, said dump valve incorporates a seat member including a passage, a ball valve which is seated on a valve seat of said seat member, a pin for upwardly moving said ball valve so as to separate said ball valve from said valve seat and an accommodating member received by said seat member and arranged to accommodate and hold said ball valve, and a throttle passage is provided for said accommodating member.

* * * * *